United States Patent
Edward et al.

(10) Patent No.: US 8,154,444 B1
(45) Date of Patent: Apr. 10, 2012

(54) EMERGENCY BEACON WITH ENCODED WARNING

(75) Inventors: Wolf A. Edward, Fort Lauderdale, FL (US); Mark Clark, Loxahatchee, FL (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 266 days.

(21) Appl. No.: 12/394,713

(22) Filed: Feb. 27, 2009

Related U.S. Application Data

(60) Provisional application No. 61/032,231, filed on Feb. 28, 2008.

(51) Int. Cl.
*G01S 19/17* (2010.01)
*G01S 1/00* (2006.01)

(52) U.S. Cl. .................. 342/357.55; 342/385

(58) Field of Classification Search ............. 342/357.21, 342/357.28, 357.46, 357.56, 385, 357.55; 701/213, 215
See application file for complete search history.

(56) References Cited

U.S. PATENT DOCUMENTS

| | | | |
|---|---|---|---|
| 5,043,736 A | 8/1991 | Darnell et al. | |
| 5,878,369 A * | 3/1999 | Rudow et al. | 701/215 |
| 6,014,080 A | 1/2000 | Layson, Jr. | |
| 6,285,281 B1 | 9/2001 | Gatto | |
| 6,518,889 B2 * | 2/2003 | Schlager et al. | 340/573.1 |
| 2008/0191863 A1 * | 8/2008 | Boling et al. | 340/521 |
| 2010/0271198 A1 * | 10/2010 | Boling et al. | 340/539.1 |

* cited by examiner

*Primary Examiner* — Dao Phan
(74) *Attorney, Agent, or Firm* — Malin Haley Dimmagio Bowen & Lhota, P.A.

(57) ABSTRACT

A personal locator beacon (PLB) that is used to transmit a radio frequency emergency distress signal. The PLB contains a GPS receiver to determine the exact global positioning coordinates of the beacon. The transmitted distress signal contains a security message that is represented through at least one bit. This bit is embedded into the standard bit string that is transmitted and can warn of impending danger at the beacon location, such as a hostage situation. The beacon is triggered through different varieties of user interfaces that utilize assorted combinations of actuators and numeric keypads. Another bit can also be embedded into the standard bit stream to represent whether or not the beacon is used by the military.

12 Claims, 5 Drawing Sheets

EMERGENCY BEACON WITH ENCODED WARNING

BACKGROUND OF THE INVENTION

1. Field of the Invention

This invention relates generally to a personal locator beacon (PLB) that is used to transmit an emergency distress signal, and particularly to a PLB that transmits an emergency distress signal containing security information warning the emergency response team of danger.

2. Description of Related Art

Through advances in electronics combined with the existing satellite infrastructure, global positioning systems (GPS) technology provides a means of locating anyone or anything on Earth. GPS has become extremely widespread, particularly in automobiles through the use of GPS navigation systems. Moreover, improvements in electronics have enabled the development of small and portable devices that when integrated with a GPS, can operate as emergency beacons. These personal locator devices are used extensively in rescue situations when an individual is in danger.

An entire organization COSPAS-SARSAT (The International Satellite-Based Search and Rescue Distress Alert Detection and Information Distribution System) exists as an infrastructure to receive and respond to emergency distress signals. Specifically, a typical locator device emits a radio frequency (RF) distress signal. Within this distress signal, GPS information is usually included to specify the exact global position of the distress signal source. The COSPAS-SARSAT system includes not only a network of satellites, but also a reticulation of land based satellite dishes, satellite control centers and emergency response organizations. Through this land based system provided for by COSPAS-SARSAT, distress signals received by satellites, are transmitted down to a local user terminal (LUT). The LUT then sends the signal to the proper search and rescue authorities, who perform the appropriate response to the distress message.

The prior art teaches a variety of PLBs to activate and transmit emergency messages. Specifically, U.S. Pat. No. 6,285,281 issued to Gatto, discloses an emergency messaging transmitter that combines a GPS receiver with a marine antenna to transmit both a distress message and a voice message to the appropriate emergency response crew. The device, however, is limited to maritime applications as it must be coupled to a marine radio with a microphone.

U.S. Pat. No. 5,043,736 issued to Darnell et al., describes a personal locator device and system that also utilizes GPS technology and any means of communicating with a central station to convey an emergency distress message. The device also utilizes a panic button to spend special emergency signals to the central monitoring station. The emergency message can be transmitted through a PSTN/Cellular connection. One disadvantage is that the described system does not work within the COSPAS-SARSAT system, thus requiring the creation of a large infrastructure to support the needs of the subscribers to the service.

U.S. Pat. No. 6,014,080 issued to Layson, Jr., discloses an emergency beacon that is small and portable, making it easily concealable. Upon activation of the device, an infrared signal representing an emergency signal is transmitted. The device can be activated by either the wearer of the unit, or a respondent in a central station. The infrared signal is detected by a searching authority and located using a device located within a second vehicle. The disadvantage of this invention is that it also is not implemented in to the COSPAS-SARSAT system. Also, instead of utilizing a GPS system, at least two respondents are necessary for locating the infrared source beacon.

A wide array of potential applications exists for emergency beacon technology. These applications include EPIRBs (Emergency Position-Indicating Radio Beacons), which are used to signal maritime disasters and ELTs (Emergency Locator Transmitters), which are used to signal aviation disasters. Furthermore, PLB (Personal Locator Beacons) can also be used by any individual undertaking a dangerous task with the potential for becoming lost, such as mountain climbing, or backcounty skiing. In one of the more promising fields, emergency beacon technology is already used extensively throughout the military. One problem that has not been addressed by the prior art, is an effective means of transmitting security messages that warn of danger, within the distress signals that are sent through the COSPAS-SARSAT system. Specifically, when a person has become kidnapped and held hostage or when there is a danger of ambush, it is critical that the search and rescue team be warned without alerting the captures that a warning signal is being transmitted with the emergency signal.

SUMMARY OF THE INVENTION

The present invention relates to a personal Emergency Position-Indicating Radio Beacon or Personal Locating Beacon (PLB) for transmitting emergency signals through the COSPAS-SARSAT system. Typically the Personal Locating Beacon broadcasts on 406 MHz and is capable of transmitting a unique identifier number, identifying the carrier. With the present invention however, in addition to the emergency signal being forced or sent which indicates that the carrier or user has a real time emergency such as being shot down in a hostile military zone or parachuting over dangerous land areas requesting search and rescue, the present invention also includes a PLB device that can transmit a special coded message to warn search and rescue personnel of potential danger in a terrorist, hostile or military situation in case the user or the carrier has been captured by the enemy or is surrounded. Specifically, the PLB device transmits a special coded message to warn of potential danger to rescue personnel. The device has specific application in hostile operations. The device contains a GPS system to calculate the exact position latitude and longitude coordinates of the beacon. These coordinates are transmitted through a RF distress signal that is emitted from the device. The RF distress signal is received by satellites in the COSPAS-SARSAT system and then transmitted back down to a local user terminal (LUT). The LUT then sends the emergency distress message to the rescue coordination center, where the appropriate rescue team is contacted and dispatched.

The distress signal is comprised of a bit string with a maximum of 144 bits. The bit string represents information that is required to be transmitted based upon the standards set forth by COSPAS-SARSAT. This information includes the GPS coordinates, error correction, and the beacon serial number. The present invention embeds a preprogrammed security bit string into the existing bit stream that is used to represent the standard information found in a digital distress signal. The security bit string, made up of at least one bit, can represent that either an authorized person is in need of rescue, or that a dangerous situation exists at the location of the distress beacon.

The process of embedding at least one bit into the standard bit stream to form an encoded security message can be initiated through a numerical keypad. By entering a specific code on a numerical keypad, at least one specific preprogrammed bit value is inserted into the standard bit stream, thus forming a distress signal that contains a security message. The bit values and sequences of values which are embedded into the standard bit stream are programmed into the microprocessor to be associated with specific input codes.

The encoded security message can also be initiated by using an actuator in combination with a numerical keypad. The actuator can be but is not limited to a push button. In this embodiment of the invention, the actuator is disguised as an "on" switch. Activation of this actuator initiates the embedding of at least one specific bit value into the standard bit stream. This embedded bit or series of bits are used to represent a warning message for the rescue dispatch. If the actuator is not triggered and a specific code is input through the numerical keypad, a different bit value or a sequence of multiple bit values is embedded into the standard bit stream. The embedded bit or sequences of bits represent a message conveying that a safe rescue situation exists in which the person or persons to be rescued are not captured or in a specific hostile environment.

In another embodiment of the present invention, the emergency beacon interface does not contain a numerical keypad. Instead multiple actuators are used to trigger the embedding of at least one bit into the standard bit stream to form the distress signal containing a security message. Specifically, the activation of the actuators in a certain sequence causes the embedding of at least one bit value into the standard bit stream to form on this signal. This bit value or sequence of bit values encodes the message that an authorized user has activated the emergency beacon in a safe environment. Likewise, lithe actuator disguised as an "on" switch is triggered alone, at least one bit value is embedded into the standard bit stream that encodes a warning message.

It is an object of the present invention to provide a personal locator beacon that attaches and transmits an encoded security message onto the distress signal. It is another object of the present invention to provide a personal locator beacon with a means for warning rescuers of impending danger.

It is furthermore another object of the present invention to provide a personal locator beacon that is capable of being identified as a military beacon or not through the sent distress signal.

It is another object of the present invention to provide a personal locator beacon that is activated using a code that is inputted through a numeric keypad.

It is still another object of the present invention to provide a personal locator beacon that is activated through the activation of actuators in a precise sequence.

These and other objects and advantages of the present invention will become apparent in the drawings and the accompanying description set forth hereinafter.

PREFERRED EMBODIMENT OF THE INVENTION

Figure 1:
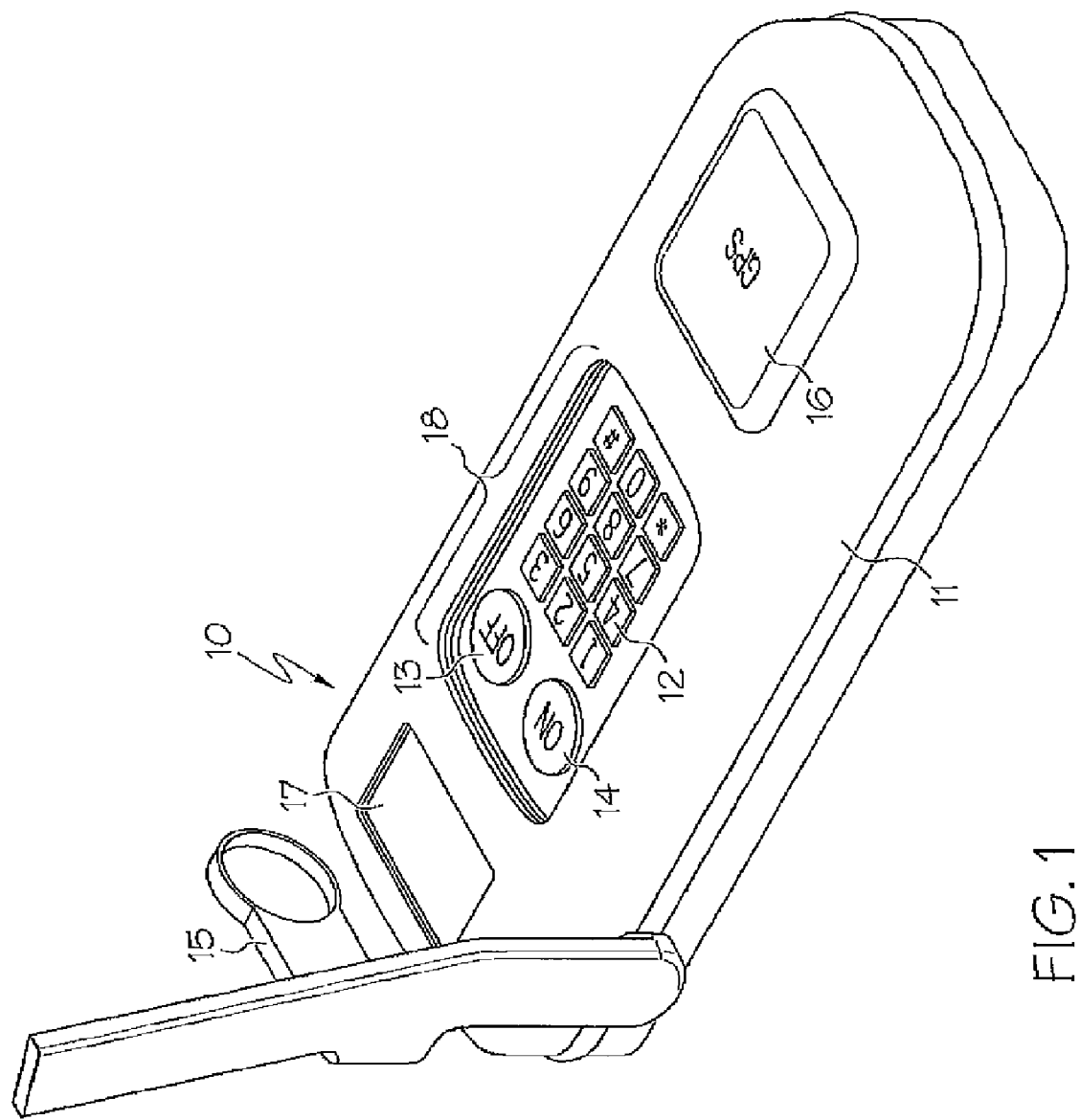
FIG. 1 shows a perspective view of the apparatus of one embodiment of the present invention that utilizes a numerical key pad.

Referring now to the drawings, specifically FIG. 1, one embodiment of the emergency beacon device 10 is shown. The emergency beacon device 10 includes a housing 11, a numerical keypad 12, an "off" actuator 13, an "on" actuator 14, a protective cover 15, a GPS receiver, and a display screen 17. The user interface 18 includes the numeric keypad 12, the "on" actuator 14, and the "off" actuator 13 can be used to control the operation of the emergency beacon device 10. The "on" actuator 14 and "off" actuator 13 can be but are not limited to push buttons. The depression in the housing 11 is deep enough such that the buttons of the numerical key pad 12 and the actuators 13 and 14 do not extend beyond the plane formed by the top surface of the housing 11. This limits the inadvertent triggering of the operation of the emergency beacon device 10. A protective cover 15 is secured to the side of the housing 11. This protective cover 15 rotates about the axis fanned at the point of attachment to the housing 11, between open and closed positions. At the bottom of the housing 11, a GPS receiver 16 is mounted. The GPS receiver 16 is used to calculate the exact position coordinates of the emergency beacon device 10. As part of the standard set forth by COSPAS-SARSAT, latitude and longitude coordinates must be included in the emergency distress message. The GPS receiver 16, using GPS technology, provides a method by which these coordinates are determined.

Figure 3:
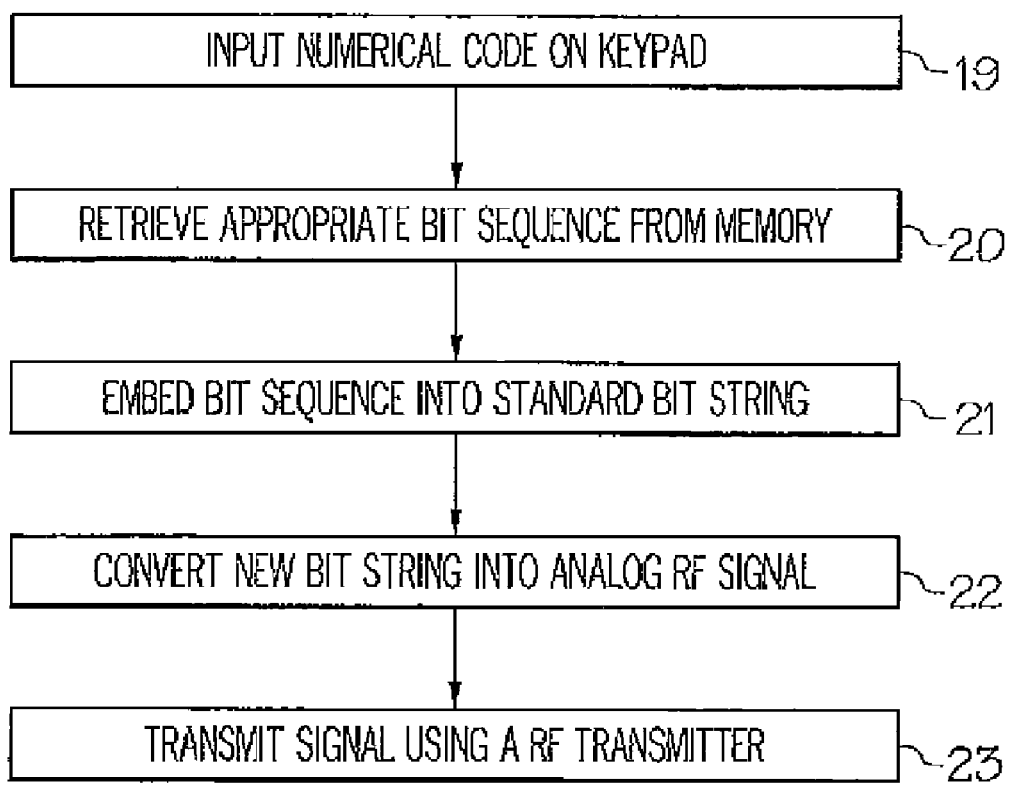
FIG. 3 shows a flow chart of the operation of one embodiment of the emergency beacon device.

Referring now to FIG. 3, a flow chart is shown outlining the operation of one embodiment of the emergency beacon device 10 that is shown in FIG. 1. Specifically, this operation is utilized with an emergency beacon device 10 which contains a numeric key pad 12. If the device user is in a non-hostile situation that does not present any danger to the rescue team, a specific code comprised of a sequence of numbers is input though the numerical keypad 19. After the code is input into the device 19, the microprocessor retrieves the bit sequence, which encodes the message that the user is authentic and the rescue situation is safe, from the memory 20. This bit sequence is comprised of at least one bit with a specific value and is preprogrammed into the device. In this embodiment of the present invention, the retrieved bit sequence represents the security message that the user is authentic, and located in a non-hostile environment. After the bit sequence is retrieved 20, the microprocessor then embeds the bit sequence into the standard bit string that is used to represent the distress message 21, thus creating a digital distress message with security information. The standard bit string used in emergency beacons must meet the standards set forth by COSPAS-SARSAT. As a result, the bit string must include the location of the beacon, error correction, and the serial number of the beacon. The microprocessor forms this standard bit string based upon the coordinates that are determined by the GPS receiver 16. The digital distress message that contains security information, which is encoded within the new bit stream, is then converted into an analog RF signal 22. Finally, the analog signal is transmitted through a RF transmitter 23. After the signal is transmitted through the RF transmitter, it is received by a satellite located within the COSPAS-SARSAT satellite network. Then the signal is transmitted back down to a LUT which sends the signal to the appropriate search and rescue coordinator.

In another embodiment of the present invention, using the process steps outlined in the flow chart of FIG. 3, emergency beacon device 10 is use to transmit a security message that warns of danger to the rescue group. In this embodiment, a code is input into the emergency beacon device 10 through the numeric keypad 19. This code is specifically used when a dangerous situation exists at the location of the beacon. The microprocessor uses this input code to retrieve a corresponding preprogrammed bit sequence from the device memory 21. The retrieved bit sequence represents the security message that a dangerous situation exists. This bit sequence is then embedded into the standard bit stream 21. The resulting bit string containing the security message is converted to an analog RF signal 22 and transmitted through a RF transmitter 23. The signal is transmitted in bursts at a frequency of 406 MHz.

Figure 4:
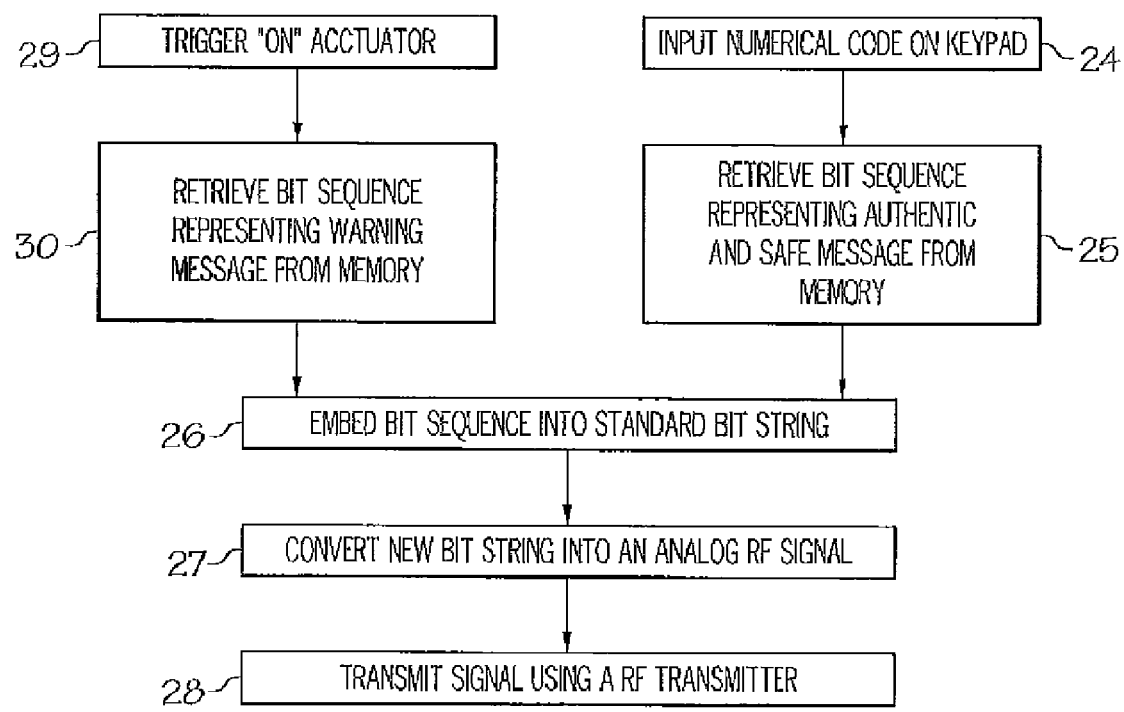
FIG. 4 shows a flow chart of the operation of another embodiment of the emergency beacon device that utilizes the "on" aperture to trigger the transmission of a warning security message.

Referring to another embodiment of the present invention, specifically FIG. 4, an operational flow chart is shown that utilizes the "on" aperture to trigger the transmission of a distress signal, which contains a security message warning of a potential danger to the rescuers. In this embodiment of the present invention, transmission of the security message signifying an authentic user and a safe rescue situation is initiated, as mentioned previously, through the input of a code through a numeric keypad 24. The bit sequence representing an authentic and safe security message is then retrieved from memory 25 and embedded into the standard bit string 26. As done in previous embodiments, the new digital bit string is converted into a RF analog signal 27 and is transmitted through a RF transmitter 28. In this embodiment of the present invention, the activation of the "on" aperture 29 is used to trigger the retrieval of the bit sequence representing a warning message from the memory 30. This bit sequence is then embedded into the standard bit string 26, after which the new bit string is converted into an analog RF signal 27 and transmitted through a RF transmitter 28. This embodiment of the present invention disguises the mechanism by which the transmission of the warning message is triggered. By concealing the triggering mechanism through the "on" actuator, in a hostage situation, the warning message can be sent without the knowledge of the captors in the situation.

Figure 2:
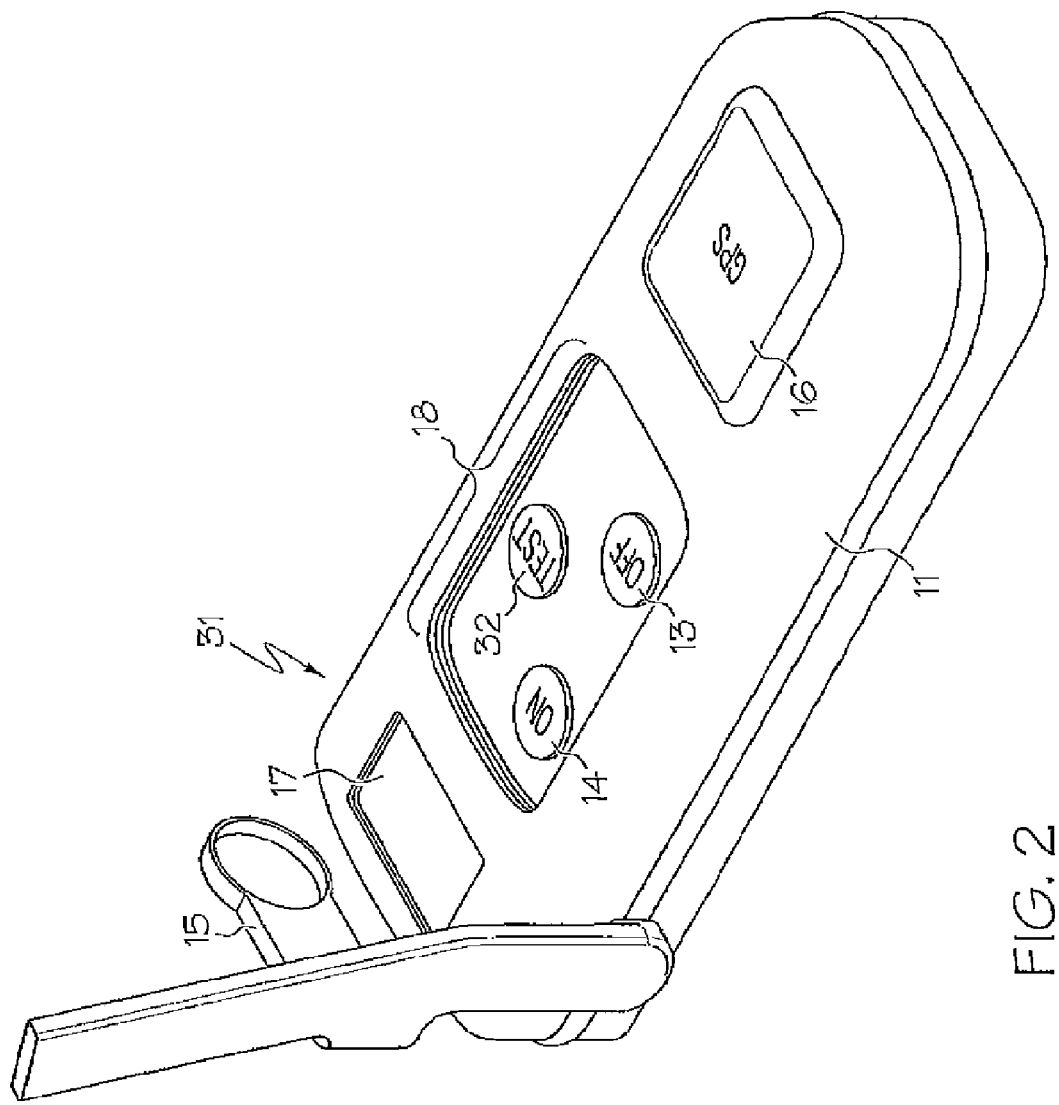
FIG. 2 shows a perspective view of the apparatus of a different embodiment of the present invention that utilizes multiple actuators without a numerical key pad.

In another embodiment of the present invention, referring to FIG. 2 specifically, a numeric keypad-less emergency beacon device 31 is shown. The keypad-less beacon device 31 consists of the same components as the previous embodiment such as a housing 11, a GPS receiver 16, a protective cover 15, a display screen 17, and a user control interface 18. These components are combined to form the numeric keypad-less emergency beacon device 31 in the same manner as the previous embodiment. The only difference is that the user control interface is comprised of three actuators, an "on" actuator 14, an "off" actuator 13, and a "test" actuator 32. The actuators can be but are not limited to push button actuators that can be labeled in any way.

Figure 5:
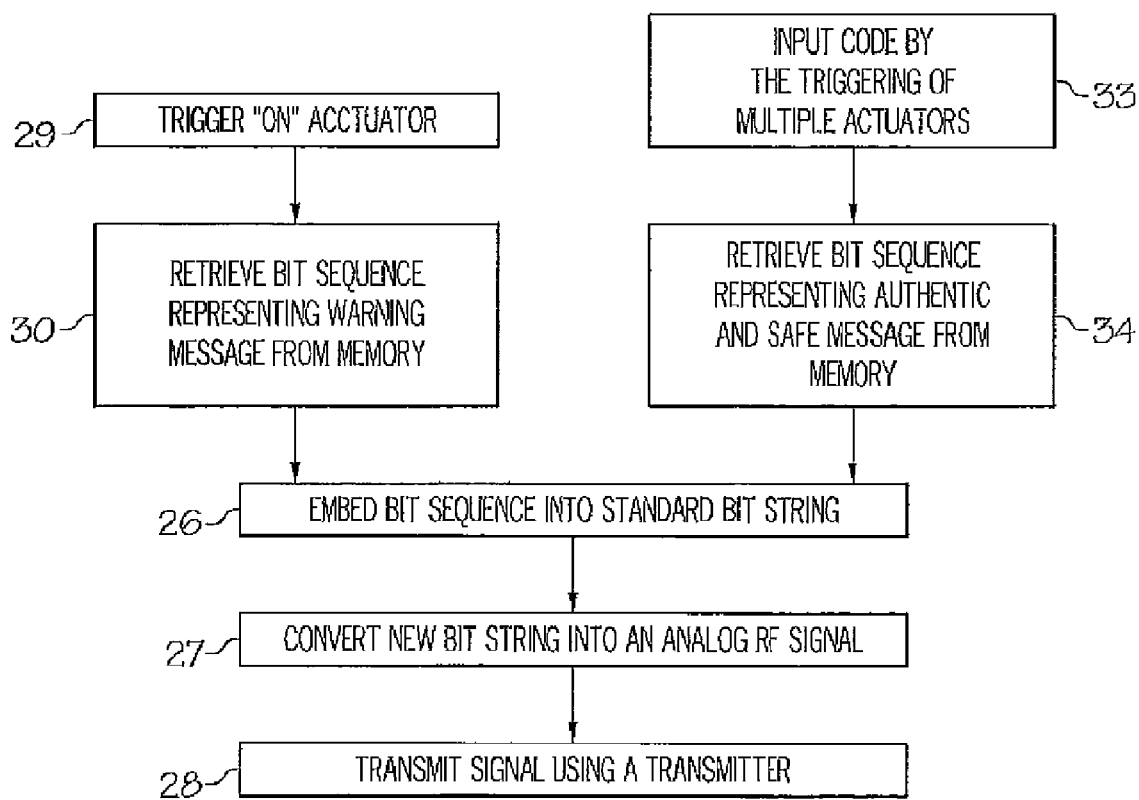
FIG. 5 shows a flow chart of another embodiment of the invention.

Referring to FIG. 5, in this embodiment of the invention, transmission of the distress signal with security information can be initiated in two ways. Just as in the previous embodiment, if the "on" actuator is activated 29, the microprocessor retrieves the bit sequence representing a warning message from the memory 30. Transmission of the distress signal can also be initiated by triggering the "on" actuator 14, the "off" actuator 13, and the "test" actuator 32 in a specific sequence, thus creating a code 33. After the code is input, the microprocessor retrieves the preprogrammed bit sequence that represents the message that conveys both an authentic user and a safe rescue condition 34. The bit sequence is then embedded into the standard bit string 26 regardless of which message is conveyed through the bit sequence. As in previous embodiments, the new bit string is converted into an analog RF signal 27 and then transmitted through a RF transmitter 28. In this embodiment of the invention, the "on" button is once again used as a disguise to activate the transmission of a warning security message in a hostage or ambush situation. The use of only three actuators provides a simpler design than a numeric keypad.

The microprocessor, in another embodiment of the present invention can also embed a single bit onto the standard bit stream or the standard bit stream combined with a security message. This single bit, depending on the value, represents whether or not the beacon is used by a member of the military. Normally, the search and rescue coordinators within the COSPAS-SARSAT system must reference the beacon's number in a database, to determine whether or not it is a military unit. Using a single bit within every distress signal to represent if the beacon is used by the military or not, allows the search and rescue coordinator to respond in a much timelier manner.

In another embodiment of the invention retrieval of data/message could corrupt the entire message in a way that allows the search and rescue coordinator to know that the transmission is not a legitimate distress signal.

In yet another embodiment of the invention, the triggering of multiple actuators can have the microprocessor disable the function of the keypad rendering the beacon useless. This feature is used to disable the entire beacon unit before the beacon might be able to fall into unfriendly hands. Basically the unit includes a planned disabling code that can be input by the user if the user is suspected that it is possible the user is being captured or will be captured shortly and that unfriendly personnel would be able to activate the beacon. Therefore, the user friendly would insert a code into the device that disables the keypad and the electronics associated with the keypad. Once the disabling code has been entered the unit would no loner function as a beacon.

The present invention is not limited to the specific embodiments described. Many different embodiments exist without departing significantly from the scope or the spirit of the present invention. The described embodiments thus serve as examples of the present invention and are not restrictive of the scope of the invention.

What is claimed is:

1. An emergency beacon device, comprising:

a microprocessor, where said microprocessor is configured to receive electronic data, generate distress message bit strings with embedded bit sequences in the format dictated by COSPAS-SARSAT, and convert generated bit strings to an analog RF signal;

a user control interface having a plurality of manual actuators, where said interface is configured to activate the beacon device and transmit electronic data representing a secret message to said microprocessor upon manual actuation of one or more of said actuators;

where the actuation of said actuators in a first preset sequence causes the beacon device to transmit to said microprocessor a first secret message and the actuation of said actuators in a sequence other than said first preset sequence causes the beacon device to transmit to said microprocessor a second secret message;

a GPS receiver configured to transmit electronic data representing the position coordinates of the beacon device to said microprocessor;

where the transmission of said first secret message to said microprocessor causes the generation a first bit string having a first embedded bit sequence, where said first bit string is in the format dictated by COSPAS-SARSAT and said first embedded bit sequence communicates that the user who actuated the interface is authentic and safe and the transmission of said second secret message to said microprocessor causes the generation a second bit string having a second embedded bit sequence, where said second it bit string is in the format dictated by COSPAS-SARSAT and said second embedded bit sequence communicates that the user who actuated the interface may be in danger; and a radio transmitter configured to receive electronic data representing the RF signal from the microprocessor and broadcast said RF signal, said RF signal being the analog form of any bit string generated by the microprocessor.

2. The method of transmitting security information through an emergency beacon device, comprising:

providing a plurality of manual actuators, where said actuators are configured to activate the beacon device and receive user input;

forming a digital distress message in the format dictated by COSPAS-SARSAT, said distress message having an embedded secret message, where the actuation of said actuators in a first preset sequence causes the distress message to contain a first secret message and the actuation said actuators in a sequence other than said first preset sequence causes the distress message to contain a second secret message and, sending the distress message, in analog form, through a RF transmitter.

3. The method of claim 2, wherein the distress message containing the first secret message communicates that a nonhostile environment exists at the location of the emergency beacon device.

4. The method of claim 3, wherein the distress message containing the first secret message communicates that an authorized person has activated the beacon.

5. The method of claim 3, wherein the distress message containing the second secret message communicates a warning that a dangerous situation that exists at the location of the emergency beacon device.

6. The method of claim 5, wherein said actuators comprise an on actuator and an off actuator.

7. The method of claim 6, wherein actuating said on actuator causes the formation of a distress message containing the second secret message.

8. The method of claim 5, wherein said actuators comprise a numerical keypad, where the formation of a distress message containing the first only occurs upon the entry of a specific code entered on the keypad.

9. An emergency beacon device, comprising:
a housing;
a microprocessor within said housing, where said microprocessor is configured to receive electronic data, generate distress message bit strings with embedded bit sequences in the format dictated by COSPAS-SARSAT, and convert generated bit strings to an analog RF signal;

a user control interface on said housing, said interface having a plurality of manual actuators, where said interface is configured to activate the beacon device and transmit electronic data representing a secret message to said microprocessor upon manual actuation of one or more of said actuators;

where said actuators comprise at least an on push button and an off push button, where the actuation of said actuators in a first preset sequence causes the beacon device to transmit to said microprocessor a first secret message and the actuation said actuators in a sequence other than said first preset sequence causes the beacon device to transmit to said microprocessor a second secret message;

a GPS receiver within said housing, where said GPS receiver is configured to transmit electronic data representing the position coordinates of the beacon device to said microprocessor;

where the transmission of said first secret message to said microprocessor causes the generation a first bit string having a first embedded bit sequence, where said first bit string is in the format dictated by COSPAS-SARSAT and said first embedded bit sequence communicates that the user who actuated the interface is authentic and safe and the transmission of said second secret message to said microprocessor causes the generation a second bit string having a second embedded bit sequence, where said second it bit string is in the format dictated by COSPAS-SARSAT and said second embedded bit sequence communicates that the user who actuated the interface may be in danger; and a radio transmitter on said housing, where said radio transmitter is configured to receive electronic data representing the RF signal from the microprocessor and broadcast said RF signal, said RF signal being the analog form of any bit string generated by the microprocessor.

10. The emergency beacon device of claim 9, where said actuators additionally comprise a numerical keypad of push buttons.

11. The emergency beacon device of claim 10, where the surface of said housing contains a depression in which said actuators are mounted such that the top of the actuator push buttons do not extend beyond the plane formed by the top surface of the housing.

12. The emergency beacon device of claim 9, additionally comprising a protective cover secured to the side of said housing, where said protective cover rotates about the axis formed at the point of attachment to the housing.

* * * * *